United States Patent Office
3,082,252
Patented Mar. 19, 1963

3,082,252
METHOD FOR PREPARING UNSYMMETRICAL BORAZOLES
Herbert C. Newsom, Whittier, William G. Woods, Anaheim, and Allen L. McCloskey, Orange, Calif., assignors to United States Borax & Chemical Corporation, Los Angeles, Calif., a corporation of Nevada
No Drawing. Filed May 10, 1961, Ser. No. 109,019
7 Claims. (Cl. 260—551)

The present invention relates as indicated to a method for preparing unsymmetrical borazoles.

The unsymmetrical borazoles are heterocyclic hexatomic ring compounds in which one or two boron atoms of the borazole ring are bonded to substituents which are different than the substituents on the rest of the atoms of the ring. The unsymmetrical borazoles having two boron atoms bonded to similar reactive groups which are different than the substituents on the other boron and nitrogen atoms are called difunctional borazoles, and the unsymmetrical borazoles which have one boron atom bonded to a reactive substituent different than the other substituents on the ring are called monofunctional borazoles.

Substantially pure difunctional borazoles having two sites on the borazole ring which are more reactive than the other sites on the ring provide a means for preparing high molecular weight, linked-borazole chain polymers while substantially pure monofunctional borazoles provide a means for the preparation of borazole dimers. Prior methods for preparing unsymmetrical borazoles, however, are tedious and costly, and are only suitable for small scale preparations of contaminated products which are extremely difficult to purify. Polymerization and other chemical studies of the unsymmetrical borazoles have therefore been limited due to the unavailability of substantially pure products.

It is, therefore, the principal object of this invention to provide an efficient and economically desirable method for preparing substantially pure unsymmetrical borazoles.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for preparing unsymmetrical borazoles having the formulae:

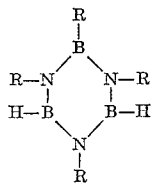

and

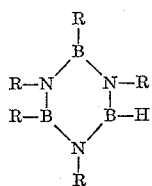

which comprises reacting a B-trihalo-N-trialkylborazole having the formula $(XBNR)_3$ with a hexaalkylborazole having the formula $(RBNR)_3$ in a closed system at a temperature of from about 170° C. to about 400° C., allowing the reaction mass to cool and solidify, adding to the resultant reaction mass at least 3 moles of an alkali metal borohydride per mole of B-trihalo-N-trialkylborazole reactant, slowly adding a glyme to said mixture and recovering substantially pure unsymmetrical borazoles from the resultant reaction mass, where R is an alkyl radical of from 1 to 6 carbon atoms and is the same for both reactants and X is selected from the group consisting of chlorine and bromine.

The reaction of the foregoing broadly stated paragraph can best be illustrated by the following equations:

(1) 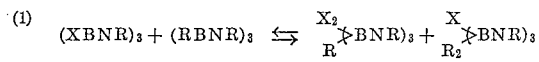

(2) 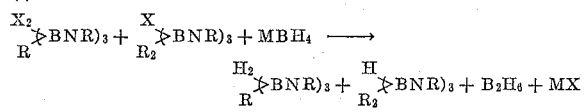

where R is the same in both reactants and is a lower alkyl radical, X is either chlorine or bromine and M is an alkali metal.

Equation 1 is an equilibrium reaction, and the resultant reaction mass comprises a mixture of B-halo-unsymmetrical borazole products and reactants which cannot be separated, and which on cooling solidify and serve as a reactant for Equation 2. We have found that reacting the reaction mass from Equation 1 with at least 3 moles of an alkali metal borohydride per mole of B-trihalo-N-trialkylborazole reactant forms the B-hydrido unsymmetrical borazoles which are readily separated one from the other and from the residual reaction mass by distillation. While any of the alkali metal borohydrides are suitable for use as a reactant, in the preferred embodiment of the invention we use sodium borohydride.

Since the resultant reaction mass from Equation 1 and the alkali metal borohydride reactants are both solids, it is expedient to provide the reactants with an inert liquid reaction medium. The liquid used for this purpose, as stated, must be inert to the components of the reaction, and must be easily separated from the desired products. The reaction media most suitable for this use are the dimethyl ethers of the ethylene glycols, commonly referred to as glymes.

The reaction temperature determines the time required for the reaction of Equation 1 to reach equilibrium and to some extent is controlling on the yield of desired product. The reaction rate is too slow for any practical applications when the reaction temperature is below about 170° C., and at above about 400° C., the reactants tend to decompose and the yield of product is consequently lowered. In the preferred embodiment of the invention these reactions are conducted at temperatures of from about 250° C. to about 350° C.

Unsymmetrical borazoles can be prepared by the present process regardless of the molar ratio of the reactants, $(XBNR)_3$ and $(RBNR)_3$, present. However, when the molar ratio of these reactants is either about 2 to 1 or about 1 to 2 the optimum concentration of the B-halo-unsymmetrical borazoles at equilibrium is obtained. It will also be noted that varying the molar ratio of the reactants is also determinative on which of the unsymmetrical borazoles, the monofunctional or the difunctional, will be present in the reaction mass in the greatest amount.

When the molar ratio of the reactants $(XBNR)_3$ and $(RBNR)_3$, is about 2 to 1 the reaction mass contains about 58 to 60% difunctional borazole, 20 to 25% monofunctional borazole and 15 to 22% reactants at equilibrium. When the molar ratio of the reactants, $(XBNR)_3$ and (RBNR)₃ is about 1 to 2 the reaction mass contains about 58 to 60% monofunctional borazole, 20 to 25% difunctional borazole and 15 to 22% reactants at equilibrium. The B-halo-unsymmetrical borazoles are then converted to the B-hydrido form by reacting these reaction masses with an alkali metal borohydride as shown above.

The borazoles applicable as reactants for the present invention are the B-trihalo-N-trialkylborazoles, (XBNR)₃, and the hexaalkylborazoles, (RBNR)₃, where R is a lower alkyl radical and X is either chlorine or bromine. The following list is illustrative of these compounds—

B-trihalo-N-trialkylborazoles:
    B-trichloro-N-trimethylborazole
    B-trichloro-N-triisopropylborazole
    B-trichloro-N-tri-t-butylborazole
    B-tribromo-N-triethylborazole
    B-tribromo-N-tri-n-propylborazole Hexaalkylborazoles:
    hexamethylborazole
    hexaethylborazole
    hexa-n-propylborazole
    hexaisopropylborazole
    hexa-n-amylborazole It is to be clearly understood that the foregoing list is only a partial enumeration of the borazoles applicable to the present invention and is not intended to limit the invention.

So that the present invention can be more clearly understood, the following illustrative examples are given:

I

A mixture of 11.30 grams (0.050 mole) of B-trichloro-N-trimethylborazole and 4.12 grams (0.025 mole) of hexamethylborazole was sealed in an evacuated ampoule and heated at 250° C. for 72 hours and was then allowed to cool and solidify. The solid reaction mass was then mixed with 7.0 grams of sodium borohydride and placed in a 200 ml., 3-necked flask. Dry triethylene glycol dimethyl ether, triglyme, 50 ml., was slowly added with a nitrogen sweep passing through the flask, and the volatile gas released was collected in a trap. The residual reaction mass was then distilled and the hydrido-borazole mixture, 9.73 grams (95% recovery based on starting borazoles) was recovered. The hydrido-borazole mixture was then distilled to yield 5.64 grams (58%) of B-methyl-N-trimethylborazole and 1.96 grams (21.2%) of B-dimethyl-N-trimethylborazole. Chemical analysis of the compounds yielded the following data:

| Calculated for $H_2 \atop CH_3 \!\!> \!\! BNCH_3)_3$, percent | Found in product, percent |
|---|---|
| B=23.81<br>C=35.16<br>H=10.26<br>N=30.77 | B=23.75<br>C=35.25<br>H=10.31<br>N=30.69 |

| Calculated for $H \atop (CH_3)_2 \!\!> \!\! BNCH_3)_3$, percent | Found in product, percent |
|---|---|
| B=21.59<br>C=39.87<br>H=10.63<br>N=27.91 | B=21.63<br>C=39.82<br>H=10.61<br>N=27.95 |

Gas chromatography showed the compounds to be about 98% and 98.3% pure, respectively.

II

A mixture of 11.30 grams (0.050 mole) of B-trichloro-N-trimethylborazole and 4.12 grams (0.025 mole) of hexamethylborazole was sealed in an evacuated ampoule and heated at 350° C. for 6 hours and was then allowed to cool and solidify. The solid reaction mass was then mixed with 5.0 grams of sodium borohydride and placed in a 200 ml., 3-necked flask. Dry triethylene glycol dimethyl ether, triglyme, 40 ml., was slowly added with a nitrogen sweep passing through the flask, and the volatile gas released was collected in a trap. The residual reaction mass was then distilled and the hydrido-borazole mixture, 9.43 grams (92% recovery based on starting borazole) was recovered. The hydrido-borazole mixture was then distilled to yield 5.10 grams (54.1%) of B-methyl-N-trimethylborazole and 2.10 grams (22.3%) of B-dimethyl-N-trimethylborazole. Chemical analysis of the compounds yielded the following data:

| Calculated for $H_2 \atop CH_3 \!\!> \!\! BNCH_3)_3$, percent | Found in product, percent |
|---|---|
| B=23.81<br>C=35.16<br>H=10.26<br>N=30.77 | B=23.71<br>C=35.36<br>H=10.34<br>N=30.59 |

| Calculated for $H \atop (CH_3)_2 \!\!> \!\! BNCH_3)_3$, percent | Found in product, percent |
|---|---|
| B=21.59<br>C=39.87<br>H=10.63<br>N=27.91 | B=21.67<br>C=39.77<br>H=10.56<br>N=28.00 |

Gas chromatography showed compounds to have a purity of about 97.6% and 98.1% respectively.

III

A mixture of 5.65 grams (0.025 mole) of B-trichloro-N-trimethylborazole and 8.24 grams (0.050 mole) of hexamethylborazole was sealed in an evacuated ampoule and heated at 250° C. for 72 hours and was then allowed to cool and solidify. The solid reaction mass was then mixed with 3.5 grams of sodium borohydride and placed in a 200 ml., 3-necked flask. Dry triethylene glycol dimethyl ether, triglyme, 50 ml., was slowly added with a nitrogen sweep passing through the flask, and the volatile gas released was collected in a trap. The residual reaction mass was then distilled and the hydrido-borazole mixture, 10.69 grams (94.6% recovery based on starting borazoles) was recovered. The hydrido-borazole mixture was then distilled to yield 2.30 grams (21.6%) of B-methyl-N-trimethylborazole and 6.13 grams (57.3%) of B-dimethyl-N-trimethylborazole. Chemical analysis of the compounds yielded the following data:

| Calculated for $H_2 \atop CH_3 \!\!> \!\! BNCH_3)_3$, percent | Found in product, percent |
|---|---|
| B=23.81<br>C=35.16<br>H=10.26<br>N=30.77 | B=23.74<br>C=35.27<br>H=10.32<br>N=30.67 |

| Calculated for $H \atop (CH_3)_2 \!\!\!> \!\!BNCH_3)_3,$ percent | Found in product, percent |
|---|---|
| B = 21.59<br>C = 39.87<br>H = 10.63<br>N = 27.91 | B = 21.67<br>C = 39.80<br>H = 10.55<br>N = 27.98 |

Gas chromatography showed the compounds to have a purity of about 97.8% and 98.1% respectively.

IV

A mixture of 22.16 grams (0.050 mole) of B-tribromo-N-tripropylborazole and 8.31 grams (0.025 mole) of hexapropylborazole was sealed in an evacuated ampoule and heated at 250° C. for 64 hours and was then allowed to cool and solidify. The solid reaction mass was then mixed with 5.0 grams of sodium borohydride and placed in a 200 ml., 3-necked flask. Dry tetraethylene glycol dimethyl ether, tetraglyme, 70 ml., was slowly added with a nitrogen sweep passing through the flask, and the volatile gas released was collected in a trap. The residual reaction mass was then distilled and the hydrido-borazole mixture, 16.90 grams, (90.7% recovery based on starting borazoles) was recovered. The hydrido-borazole mixture was then distilled to yield 9.58 grams (56.7%) of B-propyl-N-tripropylborazole and 3.62 grams (21.4%) of B-dipropyl-N-tripropylborazole. Chemical analysis of the compounds yielded the following data:

| Calculated for $H_2 \atop C_3H_7 \!\!\!> \!\!BNC_3H_7)_3,$ percent | Found in product, percent |
|---|---|
| B = 13.08<br>C = 57.95<br>H = 12.07<br>N = 16.90 | B = 12.90<br>C = 58.13<br>H = 12.21<br>N = 16.76 |

| Calculated for $H \atop (C_3H_7)_2 \!\!\!> \!\!BNC_3H_7)_3,$ percent | Found in product, percent |
|---|---|
| B = 11.19<br>C = 61.96<br>H = 12.39<br>N = 14.46 | B = 11.28<br>C = 61.79<br>H = 12.31<br>N = 14.62 |

Gas chromatography showed the compounds to have a purity of about 97.4% and 97.8% respectively.

V

A mixture of 22.16 grams (0.05 mole) of B-tribromo-N-tripropylborazole and 8.31 grams (0.025 mole) of hexapropylborazole was sealed in an evacuated ampoule and heated at 350° C. for 4 hours and was then allowed to cool and solidify. The solid reaction mass was then mixed with 7.0 grams of sodium borohydride and placed in a 200 ml., 3-necked flask. Dry tetraethylene glycol dimethyl ether, tetraglyme, 70 ml., was slowly added with a nitrogen sweep passing through the flask, and the volatile gas released was collected in a trap. The residual reaction mass was then distilled and the hydrido-borazole mixture, 17.01 grams (91.3% recovery based on starting borazoles) was recovered. The hydrido-borazole mixture was then distilled to yield 9.44 grams (55.5%) of B-propyl-N-tripropylborazole and 3.71 grams (21.8%) of B-dipropyl-N-tripropylborazole. Chemical analysis of the compound yielded the following data:

| Calculated for $H_2 \atop C_3H_7 \!\!\!> \!\!BNC_3H_7)_3,$ percent | Found in product, percent |
|---|---|
| B = 13.08<br>C = 57.95<br>H = 12.07<br>N = 16.90 | B = 12.88<br>C = 58.16<br>H = 12.23<br>N = 16.73 |

| Calculated for $H \atop (C_3H_7)_2 \!\!\!> \!\!BNC_3H_7)_3,$ percent | Found in product, percent |
|---|---|
| B = 11.19<br>C = 61.96<br>H = 12.39<br>N = 14.46 | B = 11.30<br>C = 61.76<br>H = 12.29<br>N = 14.65 |

Gas chromatography showed the compounds to have a purity of 98.0% and 97.3% respectively.

VI

A mixture of 11.08 grams (0.025 mole) of B-tribromo-N-tripropylborazole and 16.62 grams (0.050 mole) of hexapropylborazole was sealed in an evacuated ampoule and heated at 350° C. for 4 hours, and was then allowed to cool and solidify. The solid reaction mass was then mixed with 3.5 grams of sodium borohydride and placed in a 200 ml., 3-necked flask. Dry tetraethylene glycol dimethyl ether, tetraglyme, 70 ml., was slowly added with a nitrogen sweep passing through the flask, and the volatile gas released was collected in a trap. The residual reaction mass was then distilled and the hydrido-borazole mixture, 20.04 grams (92% recovery based on starting borazoles) was recovered. The hydrido-borazole mixture was then distilled to yield 11.18 grams (55.8%) of B-dipropyl-N-tripropylborazole and 4.45 grams (22.2%) of B - propyl - N - tripropylborazole. Chemical analysis of the compounds yielded the following data:

| Calculated for $H_2 \atop C_3H_7 \!\!\!> \!\!BNC_3H_7)_3,$ percent | Found in product, percent |
|---|---|
| B = 13.08<br>C = 57.95<br>H = 12.07<br>N = 16.90 | B = 12.96<br>C = 58.04<br>H = 12.14<br>N = 16.86 |

| Calculated for $H \atop (C_3H_7)_2 \!\!\!> \!\!BNC_3H_7)_3,$ percent | Found in product, percent |
|---|---|
| B = 11.19<br>C = 61.96<br>H = 12.39<br>N = 14.46 | B = 11.27<br>C = 61.82<br>H = 12.34<br>N = 14.57 |

Gas chromatography showed the compounds to have a purity of about 97.8% and 97.5% respectively.

Other modes of applying the principle of the invention may be employed, change being made as regards the details described, provided the features stated in any of the following claims or the equivalent of such be employed.

We, therefore, particularly point out and distinctly claim as our invention:

1. The method for preparing unsymmetrical borazoles having the formulae:

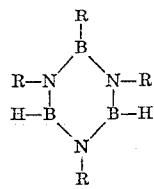

and

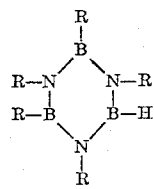

which consists essentially of reacting a B-trihalo-N-trialkyl borazole having the formula $(XBNR)_3$ with a hexaalkylborazole having the formula $(RBNR)_3$ in a closed system at a temperature of from about 170° to about 400° C., allowing the reaction mass to cool and solidify, adding to the resultant reaction mass at least 3 moles of an alkali metal borohydride per mole of B-trihalo-N-trialkylborazole reactant, slowly adding a glyme to said mixture and recovering substantially pure unsymmetrical borazoles from the resultant reaction mass; where R is an alkyl radical of from 1 to 6 carbon atoms and is the same for both reactants, and X is selected from the group consisting of chlorine and bromine.

2. The method for preparing unsymmetrical borazoles having the formulae:

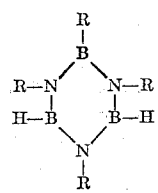

and

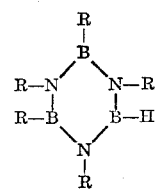

which consists essentially of reacting a B-trihalo-N-trialkylborazole having the formula $(XBNR)_3$ with a hexaalkylborazole having the formula $(RBNR)_3$ in about a 2 to 1 molar ratio in a closed system at a temperature of from about 250° C. to about 350° C., allowing the reaction mass to cool and solidify, adding to the resultant reaction mass at least 3 moles of sodium borohydride per mole of B-trihalo-N-trialkylborazole reactant, slowly adding a glyme to said mixture and recovering substantially pure unsymmetrical borazoles from the resultant reaction mass; where R is an alkyl radical of from 1 to 6 carbon atoms and is the same for both reactants, and X is selected from the group consisting of chlorine and bromine.

3. The method for preparing unsymmetrical borazoles having the formulae:

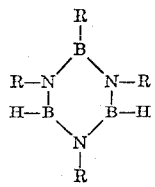

and

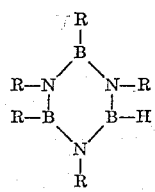

which consists essentially of reacting a B-trihalo-N-trialkylborazole having the formula $(XBNK)_3$ with a hexaalkylborazole having the formula $(RBNR)_3$ in about a 1 to 2 molar ratio in a closed system at a temperature of from about 250° C. to about 350° C., allowing the reaction mass to cool and solidify, adding to the resultant reaction mass at least 3 moles of sodium borohydride per mole of B-trihalo-N-trialkylborazole reactant, slowly adding a glyme to said mixture and recovering substantially pure unsymmetrical borazoles from the resultant reaction mass; where R is an alkyl radical of from 1 to 6 carbon atoms and is the same for both reactants, and X is selected from the group consisting of chlorine and bromine.

4. The method for preparing B-methyl-N-trimethylborazole and B-dimethyl-N-trimethylborazole which consists essentially of reacting B-trichloro-N-trimethylborazole and hexamethylborazole in about a 2 to 1 molar ratio in a closed system at a temperature of from about 250° C. to about 350° C., allowing the reaction mass to cool and solidify, adding to the resultant reaction mass at least 3 moles of sodium borohydride per mole of B-trichloro-N-trimethylborazole reactant, slowly adding triglyme to said mixture and recovering substantially pure B-methyl-N-trimethylborazole and substantially pure B-dimethyl-N-trimethylborazole from the resultant reaction mass.

5. The method of claim 4 wherein said B-trichloro-N-trimethylborazole and said hexamethylborazole are present in about a 1 to 2 molar ratio.

6. The method for preparing B-propyl-N-tripropylborazole and B-dipropyl-N-tripropylborazole which consists essentially of reacting B-tribromo-N-tripropylborazole and hexapropylborazole in about a 2 to 1 molar ratio in a closed system at a temperature of from about 250° C. to about 350° C., allowing the reaction mass to cool and solidify, adding to the resultant reaction mass at least 3 moles of sodium borohydride per mole of B-tribromo-N-tripropylborazole reactant, slowly adding tetraglyme to said mixture and recovering substantially pure B-propyl-N-tripropylborazole and substantially pure B-dipropyl-N-tripropylborazole from the resultant reaction mass.

7. The method of claim 6 wherein said B-tribromo-N-tripropylborazole and said hexapropylborazole are present in about a 1 to 2 molar ratio.

No references cited.